(12) United States Patent
Zwieg (10) Patent No.: US 8,371,131 B2
(45) Date of Patent: Feb. 12, 2013

(54) ICE NUCLEATING NON-STICK COATING

(75) Inventor: Thomas Zwieg, Odder (DK)

(73) Assignee: Danish Technological Institute Industry, Materials Testing, Aarhus C (DK)

(*) Notice: Subject to any disclaimer, the term of this patent is extended or adjusted under 35 U.S.C. 154(b) by 1759 days.

(21) Appl. No.: 10/477,183

(22) PCT Filed: May 8, 2002

(86) PCT No.: PCT/DK02/00306
§ 371 (c)(1),
(2), (4) Date: Jul. 19, 2004

(87) PCT Pub. No.: WO02/090459
PCT Pub. Date: Nov. 14, 2002

(65) Prior Publication Data
US 2004/0249222 A1    Dec. 9, 2004

(30) Foreign Application Priority Data

May 8, 2001 (DK) .................................. 2001 00723

(51) Int. Cl.
*F25C 1/00* (2006.01)
(52) U.S. Cl. ............................................. 62/66
(58) Field of Classification Search ............... 62/66, 85; 427/387, 8, 154, 385.5, 389.7; 428/402–404, 428/442, 402.2, 402.22, 402.24, 413–422, 428/447; 252/70, 408.1; 210/650; 116/201, 116/206; 524/501, 506–507, 545–546
See application file for complete search history.

(56) References Cited

U.S. PATENT DOCUMENTS

| | | | | |
|---|---|---|---|---|
| 3,272,434 A | * | 9/1966 | Zettlemoyer et al. | 239/2.1 |
| 3,858,805 A | * | 1/1975 | Shen et al. | 239/2.1 |
| 4,484,409 A | * | 11/1984 | Caple et al. | 47/2 |
| 4,585,571 A | * | 4/1986 | Bloom | 252/70 |
| 4,774,112 A | | 9/1988 | Achtenberg | |
| 5,413,865 A | | 5/1995 | Nakamura et al. | |
| 5,741,551 A | * | 4/1998 | Guire et al. | 427/407.1 |
| 5,741,828 A | * | 4/1998 | Stoy et al. | 524/501 |
| 6,027,805 A | * | 2/2000 | Yamanouchi et al. | 428/402.2 |
| 6,084,020 A | * | 7/2000 | Smith et al. | 524/501 |
| 6,319,980 B1 | | 11/2001 | Ishikawa et al. | |

FOREIGN PATENT DOCUMENTS

| | | |
|---|---|---|
| DE | 41 15 857 A1 | 11/1991 |
| DE | 196 26 162 A1 | 1/1998 |
| EP | 0 344 919 A2 | 12/1989 |
| JP | 2002-292410 | 9/2000 |
| WO | WO 00/06958 | 2/2000 |

OTHER PUBLICATIONS

Gabor Vali; Ice Nucleation Theory, A Tutorial; Jun. 25, 1999; www-das.uwyo.edu/~vali.*

Database WPI, Section CH, Week 200237, Derwent Publicaitons Ltd., Londin, GB; Class G02, AN 2002-292410, XP002902662 & JP 2002 088347 A (Sekisui Jushi KK), Mar. 27, 2002, Abstract.

* cited by examiner

*Primary Examiner* — Frantz Jules
*Assistant Examiner* — Emmanuel Duke
(74) *Attorney, Agent, or Firm* — Roberts Mlotkowski Safran & Cole, P.C.; David S. Safran (57) ABSTRACT

Heterogeneous surface with polar functional groups as nucleation points. These nucleation points cause precipitation of a substance, for example ice or salt, in a fluid at these nucleation points under suitable physical conditions because the Gibbs free energy of the system is lower at the nucleation points than between the nucleation points, where said system comprises said surface and said fluid with said substance near said surface.

27 Claims, 6 Drawing Sheets

ICE NUCLEATING NON-STICK COATING

FIELD OF THE INVENTION

The present invention relates to ice non-stick surface coatings.

BACKGROUND OF THE INVENTION

Ice layers at technical surfaces often cause serious safety risks and damages in technical applications. The ice formation at especially air-plane wings, ship decks and cables during the winter time are well known examples. The avoidance of this ice formation and the lowering of the adhesion between ice and surface have therefore been in focus for international research and development in the last few decades.

Hydrophobic surface properties are a known basis for the design of ice repellent coatings. A relative large amount of different coating systems have been developed and applied during the last 30 years. According to the definition of the work of adhesion, mainly water repellent materials with a very low surface tension like PTFE (Teflon) or Polyethylene have been chosen. In recent years, new silicone containing coatings like PDMS (Polydimethylsiloxane) were introduced for this purpose, as well.

For atmospheric ice, the problems could partly be solved by these coatings. But the live time, the mechanical stability, and also the stability of the anti adhesive properties are not satisfying expectations. Commercially available icephobic coatings are typically freeze-depressing due to the hydrophobic effect. Unfortunately, at certain super cooling, strong icing occurs at these coated surfaces, destroying the icephobicity. Challenges especially for air plane applications still exist.

Ice generation at cooled surfaces for refrigeration purposes or ice cream production shows similar challenges: the here desired and formed ice has to be removed by expensive mechanical scrapping devices or by short time heat input. The application of the above mentioned coatings has also been tried in this branch, but without success.

The latter being due to mainly three reasons, the change of properties of the coating during use, especially because of wear, the dramatically reduction of heat transfer due to the very low heat conductivity of these typically thick coatings, and the heavy decreasing ice forming rate because of the low wet ability of these surfaces.

On a normal treated, cooled heat exchanger surfaces, the crystallized ice is sticking with strong adhesion forces. According to the temperature gradients just above the cooled surface with the flowing brine, a flat, compact ice layer will be created. If not removed by, for example, mechanical scrapping devices, this ice layer may increase in thickness with time and result in a decreasing and finally stopping flow.

Existing developments on the basic of fluorinated organic coatings, cannot overcome this problem. The typical water repellent properties of fluorinated organic surfaces at room temperature are generally not transferable to ice repellent properties for the actual application.

Fluorinated coatings such as commercial types of PTFE, FEP but also fluorinated alkoxsilanes from different sol gel coating systems have been tested but appeared generally not convincing in their icephobicity. In the tests, these fluorinated coatings showed the highest hydrophobicity at contact angles of approximately 95 up to 115 degrees to water and water/freezing-depressant solutions. But this higher hydrophobicity had no visible influence on the surface-icing behavior. Based on the tests, it can be concluded that hydrophobic surfaces are not consequently also icephobic. Obviously, the distinct hydrophobicity of fluorinated coating systems is no longer effective when ice crystals with their strong polarity and directed dipole moments are formed at the surface. A dipole seems to be induced in the high electronegative fluorine resulting in secondary forces and sticking of the ice. Furthermore, mechanical interlocking of the ice crystals formed at the PTFE surface occurs because of the well-known porosity of the sintered PTFE surface.

Though existing silicone based lacquer coating types show good ice repellent properties, a very insufficient mechanical stability and very low heat conductivity of these coatings makes the application for the actual purpose impossible. The relative abrasive ice particles destroy these coatings already after short time. Also, the dramatically decreased ice nucleation rate is a further highly negative factor.

According to the disclosure in International patent application WO 00/06958, sol gel technology has been used for the production of a corrosion resistant hydrophobic coating which also appears to prevent ice formation on the surface of an evaporator. This condition is however only valid for surface temperatures that are very close to the freezing point. If the temperature of the surface is substantially below the freezing point, ice will form on the surface despite the hydrophobic conditions.

SUMMARY OF THE INVENTION

It is the purpose of the invention to develop a new surface coating with non-stick properties in connection with ice formation or other precipitation substances in fluids.

This purpose is achieved by a heterogeneous surface having nucleation points for causing precipitation of a substance in a fluid at these nucleation points under suitable physical conditions, the heterogeneous surface being configured such that the Gibbs free energy at the nucleation points when the surface is in contact with the fluid and the substance is lower at the nucleation points than between the nucleation points.

As suitable physical conditions is meant conditions under which precipitation is possible. For ice formation, the physical conditions are suitable temperatures, while for salt precipitation from a liquid, the physical conditions include also the concentration of salt in the liquid.

The heterogeneous surface is a non homogenous surface that contains at least two physically, chemically different components distributed for example regularly or statistically, where one of the components may, for example, be a polar functional groups.

For example, nucleation points are covalently bound to the material building up the heterogeneous surface, though this is not necessary for the basic idea of the invention.

The nucleation points are preferably reactive functional groups or residues. In a practical embodiment of the invention, the nucleation points may be reactive hydrophilic functional end groups like epoxy, amino, carboxyl, hydroxyl, methacryl. However, a polymer like polyanilin may also be used for constructing nucleation points.

Preferably, the heterogeneous surface comprises at least one from the following:
- polar areas as nucleation points and non-polar islets between said nucleation points,
- hydrophilic areas as nucleation points and hydrophobic islets between said nucleation points,
- segments with high surface energy acting as nucleation sites surrounded by a low surface energy matrix, separated reactive residues, for example OH⁻ or O⁻, as nucleation points, which are a result of a cross linking process between functional end groups from organo-substituted alkoxides, surrounded by a non-reactive functional matrix.

According to the invention, the polar groups may be regularly or statistically distribsited over the surface area and be cross-linked, for example thermally, to the component surface and/or cross linked with metal alkoxides and/or cross-linked with organic polymers, which are cross linked with the component surface. These polar functional groups are surrounded by non-polar compounds, cross linked to the component surface in similar manner, insulating and separating the polar segments from each other. Especially, the reactive functional groups may be cross-linked with hydrophobic organic polymers in order to realize larger areas with ice repellent hydrophobic properties and small local areas with hydrophilic properties as nucleation points.

In practice, hybrid layers forming a inorganic-organic network were manufactured through hydrolysis, condensation and additional reactions from a combination of polymerized molecular silicone alkoxides $Si(OR)_4$, organic modified silicone alkoxides $(R—Si(OR)_3)$ and furthermore organic polymers.

In a first step, the nanoparticles of the coatings were synthesized by sol-gel technology, involving the synthesis of functionalized nanoparticles from functionalized silanes:

As organic reactive end group aryl and alkyl residua were used.

These nanoparticles were thermally cross-linked to the solid surface, for example the aluminum oxide layer at the tube or plate heat exchanger surface. Furthermore, these particles can in additional be cross-linked with hydrophobic polymers to further increase the anti adhesive properties and also the ice repellence surface area. For this invention, allylbenzenes and alkylphenols were applied.

Due to the selection of the reactive end group of the organosilane, the smooth nanostructured layers contain both the hydrophobic, anti adhesive compounds as well as hydrophilic segments. In order to achieve these hydrophilic segments, silicone alkoxides with reactive hydrophilic functional end groups like epoxy, amino, carboxyl, hydroxyl or methacryl, or other organic components, for example polyaniline, were applied. Due to the cross-linking process separated free polar radicals or polar functional groups could be accomplished in the coating surface. This way, very small hydrophilic segments could be obtained in order to act as local separated nucleation sites.

Characterized through the synthesis of hydrophilic as well as hydrophobic nanoparticles and the choice of different length of the bridging organic segments, the versatility of this process allows a broad variation of the surface properties.

The ice repellent coating developed here is characterized as a smooth anti adhesive surface with local, regularly distributed ice nucleation points, which are separated from each other. Similar to a chess game with their black and white fields, small local ice nucleation segments or sites with higher surface energy are surrounded by anti adhesive ice repellent segments or areas with lower surface energy. These segments show hydrophilic and hydrophobic properties respectively. Due to the locally different surface energies, the generation of a compact ice layer is visibly distorted and avoided. Furthermore, the adhesion of the generated ice crystals is reduced dramatically both in strength and contact area. The removal of the generated ice crystals is hereby possible just with the flow of the brine along the surface. According to these facts, an ice generator can be manufactured without moving scrapping devices.

Furthermore, the selection of the distances between the single hydrophilic ice nucleation sites determines the size of the produced ice particles, which can be utilized in a process, where production of ice particles with controlled size is desired or necessary.

The thickness of the applied coatings is normally less than 10 microns. Hereby, the heat conductivity is strongly increased as compare to conventional coatings. Due to the formation of a inorganic-organic network covalent cross-linked to the metal or polymer surface, a very good mechanical and abrasion resistant ice repellent surface is realized. Also, due to the covalent bonding, a coating delaminating will not occur.

As it has turned out during the intensive study of this problem and during varies experiments, the basic idea behind the invention is not limited to hydrophilic nucleation points in an else hydrophobic matrix. According to our invention localized precipitation of substances can be achieved if there are locally separated polar nucleation points with lower Gibbs free energy in a non-polar matrix.

The invention is suitable for a very large variety of application, for example
production of ice crystals in air,
production of ice crystals in a liquid,
production of ice crystals in water containing a freezing point depressing agents,
production of water ice in water containing ethanol,
production of water ice in water containing propylene glycol,
production of water ice in water containing ethylene glycol,
slush ice production,
production of an ice repellent component surface,
refrigeration systems,
air conditioning systems.
production of ice cream,
avoiding ice adhesion at a component surface,
avoiding ice adhesion on an airplane, a helicopter wing, or a wind mill wing, or a ship,
avoidance of lime stone adhesion at a component surface
precipitation of salt in a liquid,
precipitation of calcium carbonate in a liquid,
precipitation of magnesium carbonate in a liquid, and
precipitation of sugar in a liquid.

SHORT DESCRIPTION OF THE DRAWING

The invention will be explained in more detail with reference to the drawing, where.

shows sketches of the ice formation process over different coating materials; the images were captured from a 7.7×5.8 mm selected area at the surface every second; circles delimit the nucleation sites and arrows follow the route of the crystals.

DETAILED DESCRIPTION/DESCRIPTION OF PREFERRED EMBODIMENT

The invention may be understood with reference to phenomenon in nature as explained in the following.

Phenomenon in Nature

Figure 1:
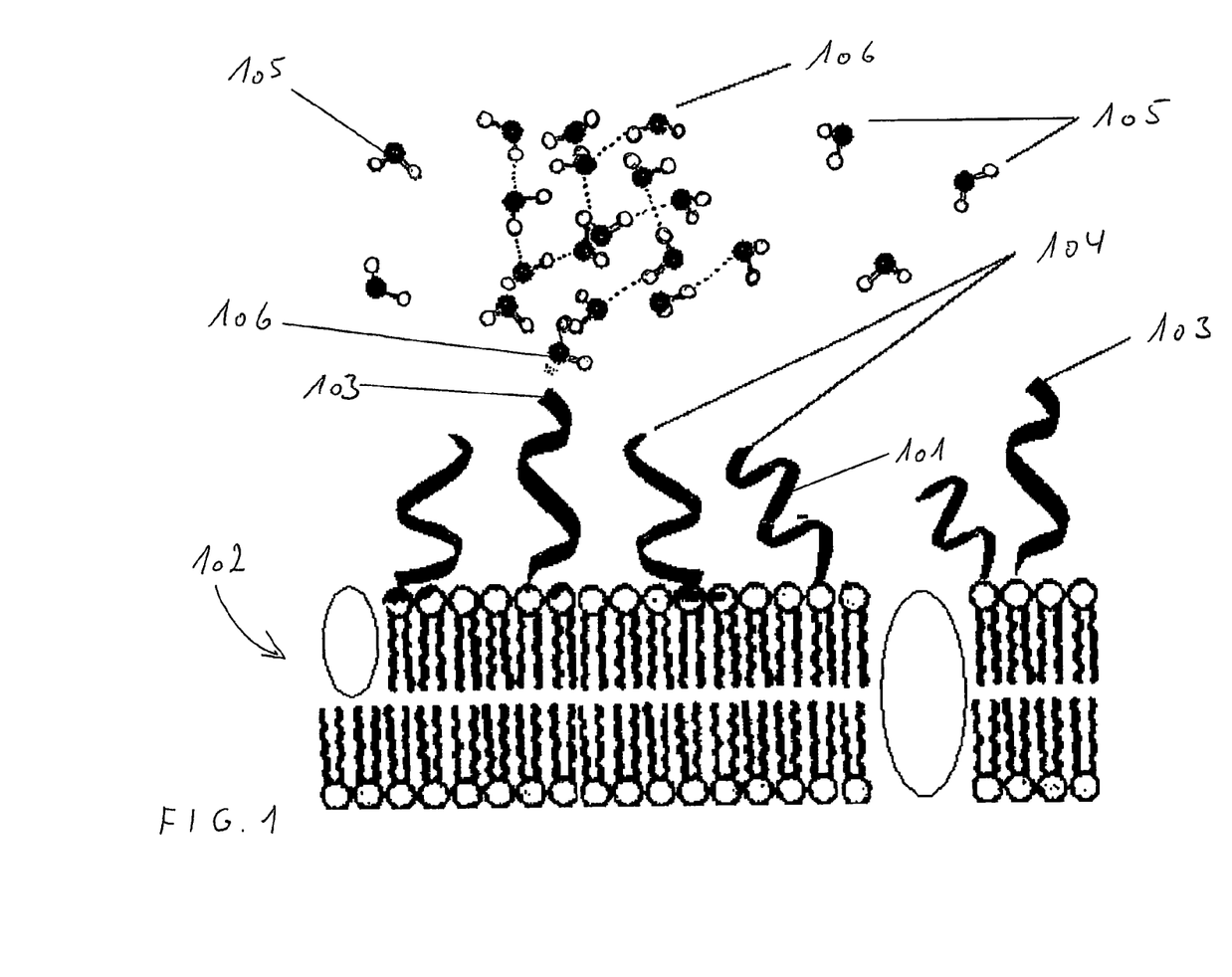
FIG. 1 is a representative scheme of the INP arrangement at the cell membrane of INA-bacteria, where hydrophilic residues act as nucleating sites, matching an ice-like structure, and where neighboring hydrophobic residues surround the nucleating site, preventing ice sticking on the cell membrane.

It is known that organisms living in arctic and alpine regions have evolved different strategies to survive extreme cold conditions. Some of these organisms are able to slow down the freezing rate by nucleating the ice at earlier "warm" subzero temperatures. Thus, cells can release water and shrink, counteracting the osmotic pressure and avoiding the freezing of the intracellular space. This activity has been reported for organisms ranging from bacteria to insects and also invertebrates. These organisms live with high percentages of ice in the extra cellular space and body fluids, but they maintain a basal metabolism. They are called INA-organisms (Ice Nucleation Activity) since they have got specific strains INA to codify for Ice Nucleating Proteins (INPs). INPs from INA-bacteria have been well characterized. They have a common repeating sequence of eight amino acids, and they are located at specific sites of the cell membrane. As illustrated in FIG. 1, Ice Nucleating Proteins (INP's) 101 arranged on the phospholipid membrane 102 build a large complex from monomers with nucleating points consisting in hydrophilic residues 103 surrounded by hydrophobic ones 104. These different physical chemically properties are obtained only due to a modified tertiary and quaternary structure of the INP's. The position of the hydrophilic residues 103 seems to mimic the ice structure and thus favors the interaction of super cooled water molecules 105 with these nucleation points 103. Because of the surrounding hydrophobic residues 104, ice 106 adhesion at the membrane 102 surface is minimized, and the ice crystal will be released at certain dimensions.

INA-bacteria have already been used as ice nucleation induces for different market purposes. One of the most studied NA-bacteria is *Pseudomonas syringae* and its commercial application is the snow making patented system SNOW-MAX™.

The motivation of this work lies in mimicking nature's solution, i.e. simulate the mechanism of INA-organisms in order to design a surface capable of nucleating and releasing ice under flow conditions. The catalytically controlled local ice nucleation is starting already at earlier subzero temperatures. Due to the consumption of cooling energy in the interface surface/fluid the strong surface icing known from commercial coating systems can be avoided.

In order to mimic the biological cell membranes of INA-bacteria, the sol-gel technology has been applied. It is known that INA-organisms need less than 60 units of INP to produce an active nucleus at −5° C. This corresponds to approximately 1200 residues (150 kDa). Based on this knowledge, only a few nanometers were expected to be the appropriate dimension of the reactive groups of the Ice Nucleating Coatings (INC).

In order to synthesize INA membrane like structures a blending of nanoparticles of different organosiloxanes was used to accomplish a heterogeneous surface containing small separated hydrophilic points in a hydrophobic matrix. These hybrid coatings were transparent with a thickness between 1 and 10 microns depending on the type of INC. A great advantage for the practical application is the low price of the INCs in larger production quantities. The experiment will be explained in the following for illustrating reasons.

Experimental Set-Up

Figure 2:
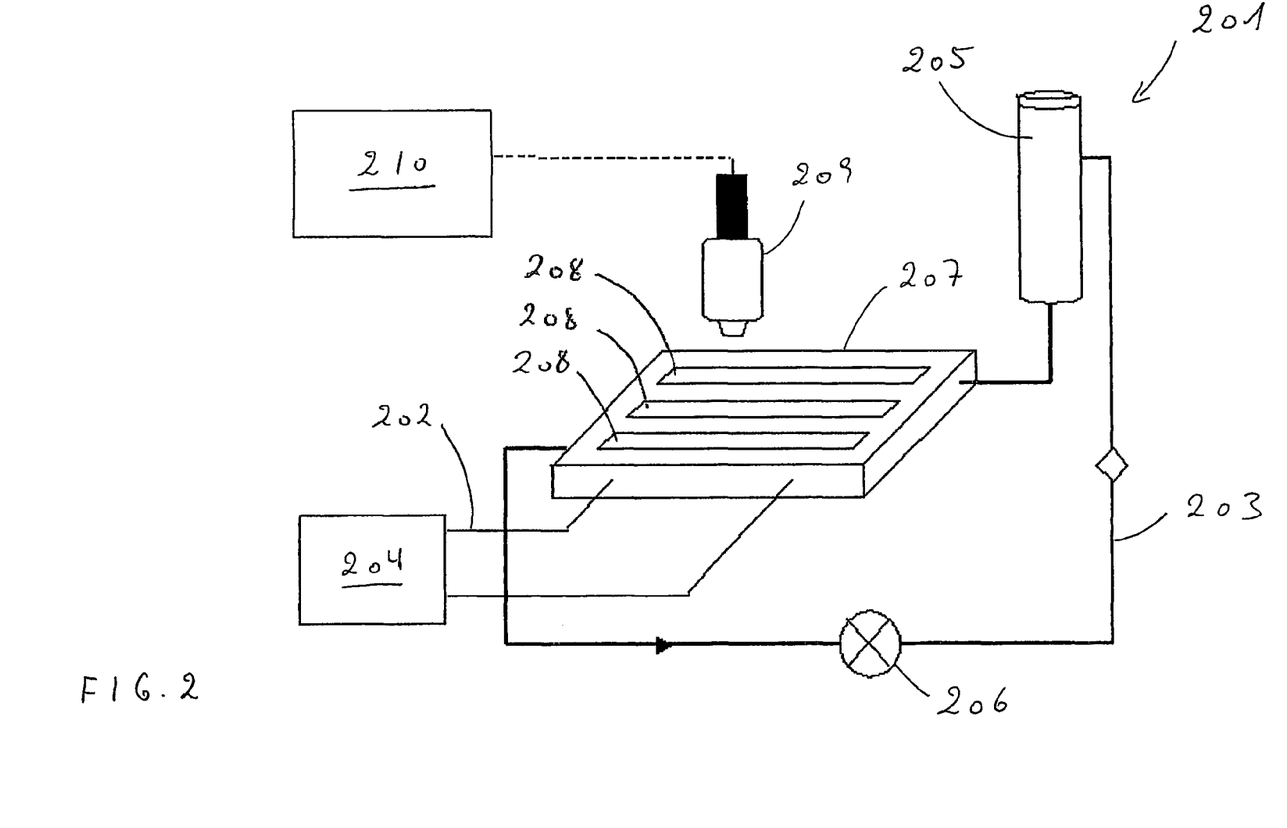
FIG. 2 shows the experimental set-up.

The experimental set-up, which is illustrated in FIG. 2, consisted of a cooling system 201 with two interconnected loops. The primary loop 202 was a commercial cryothermostat unit 204 running with an ethylene glycol-water mixture of 30%. The secondary loop 203 included a 2.5 liter storage tank 205, a Grundfos CD050MF model pump 206 and a specially developed crystallization chamber 207 allowing in-situ observation of the ice crystallization process.

The chamber 207 was designed as a heat exchanger. In the three channels 208, exchangeable half pipes were installed, covered with a transparent window at the top in order to allow the process to be observed. The half pipes were 450 mm long and had 34 mm of inner diameter. The total surface area per half pipe was 480 $cm^2$. The chamber 207 was cooled from below. The whole system was thermally insulated. Temperature and flow meters were included in the system. The temperature was measured in the primary loop 202, the storage tank 205, and directly at the surface of the half pipes. The thermocouples above the tube surface could be moved up and down in a cross section over the fluid direction in order to obtain the temperature gradient between the heat transfer surface and the bulk of the brine. The brine velocity through the secondary loop could be varied with a speed of up to 0.7l/s.

A Leica $MZ12_5$ light microscope 209 with polarization filter adapted to a 3CCD SONY DXC 950P color videocamera was located above the upper window of the chamber. Video sequences were recorded during the freezing process using a Pinnacle microVideo DC 30plus computer video capture system functionally connected to a computer system 210. A light supply unit Schott KL 2500 LCD with polarization lenses working at 3000 K was included in the set-up.

Experimental Procedure

A mixture of demineralized water and a freezing depressant was used in the experiments. The freezing point depressing additives were ethanol, propylene glycol and ethylene glycol. The concentration of these additives was adjusted to reach freezing points of the mixture at −2.5, −5 and −7.5° C. with exception of ethanol, which has only been tested at −5 and −7.5° C.

In order to evaluate the ice forming ability of a coating system, three tubes coated in the same way were tested. Each crystallization experiment was repeated at least three times for every brine concentration. Depending on the results of these experiments, further experiments were carried out or the experiments were stopped. For each experiment, several video sequences with a length of 90 seconds were taken during the ice crystallization process.

The influence of parameters like super cooling rate, flow velocity and temperature gradient between the primary 202 and the secondary loop 203 on the crystallization behavior of the promising coating materials has been tested in order to define proper regimes for the production of ice crystals.

The amount of ice formed on the cooled surface was later estimated by means of image processing of the video sequences. By using the Adobe Premiere and Image-Pro Plus software, video and image analyses have been carried out. High quality frames were taken from the video sequence every second during a selected period of thirty seconds. A black and white contrast analysis using the Image-Pro Plus software allowed the ice crystals to be identified and the average area to be measured. The values are given as percentage of surface for a representative 7.7 mm×5.8 mm area of the total surface.

Materials

The exchangeable half tubes for the crystallization chamber were fabricated mainly of the aluminum alloy EN AW 6060. For the test of some coatings, St52 steel half tubes were also used. For most of the tubes, no further mechanical pre-treatment like grinding, polishing or blasting was carried out prior to the coating process. In order to clean the tube surfaces, degreasing and etching were carried out. For selected experiments, the tube surface was glass blasted for increasing the surface roughness.

A large number of different coatings have been selected in order to find a surface treatment/modification able to both nucleate and release the ice formed. The selection was based on reported coating systems for ice repellent purposes found in literature. It included both organic e.g. different types of PTFE systems as well as inorganic coatings like nickel. The parameters, which were varied in the experiments, were the surface energies, the surface roughness, the surface structure and the coating thickness. Based on these experiences, novel ice-nucleating coatings (INCs) have been developed and evaluated in the crystallization chamber.

Figure 3:
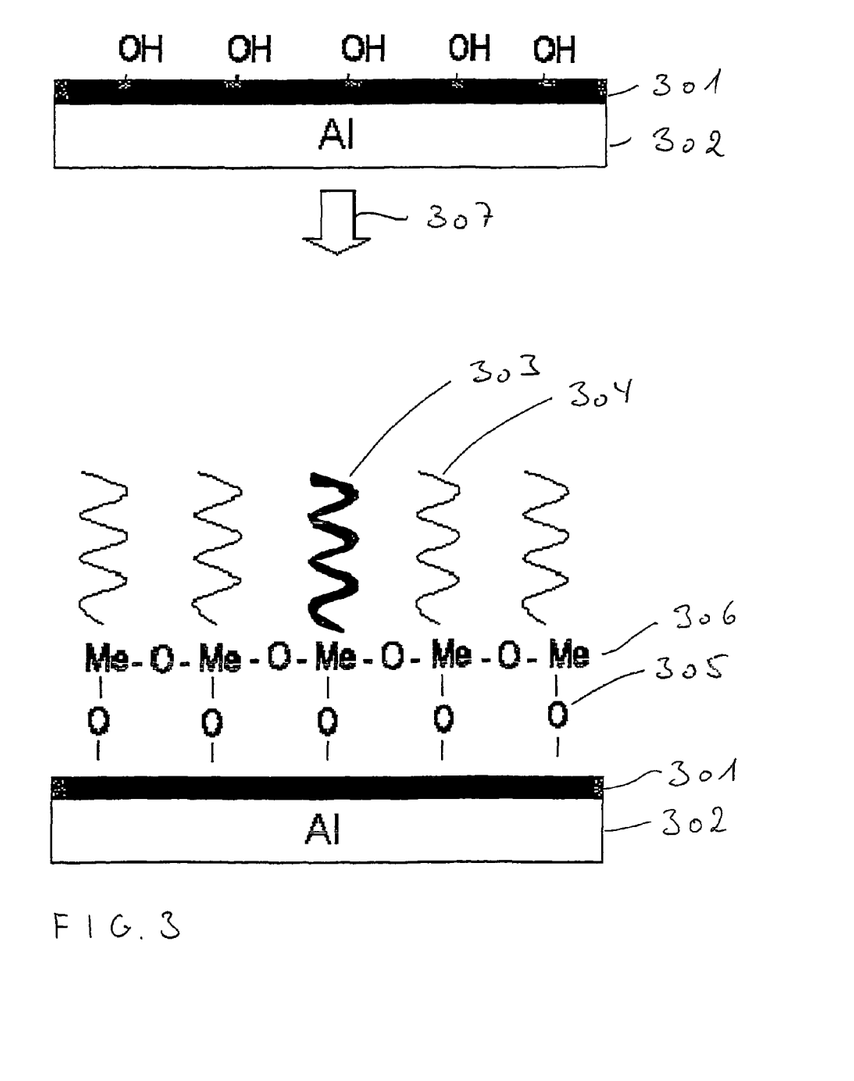
FIG. 3 illustrates the surface modification process of the aluminum oxide by applying the sol-gel technology with hydrophilic and hydrophobic residues.

For producing the ice nucleating coatings (NCs) the sol-gel technology was applied, which is illustrated in FIG. 3 showing the surface modification 307 of a hydrolized aluminum oxide layer 301 on aluminum 302. Nanoparticles with both hydrophobic 303 and hydrophilic 304 properties were synthesized from organic modified silicone alkoxides. These nanoparticles 303, 304 were thermally cross-linked with oxygen bridges 305 to the pre-treated surface of the aluminum 302 half pipes. Smooth, very thin nanostructured hybrid layers 306 were created at the metalsurface, formed by an inorganic-organic network. The index Me in FIG. 3 is used for metallic atoms, for example Al, Ti, Zr or Hf, or semi-conductors, as Si. Due to the selection of the reactive functional groups of the organosilane, the nanostructured layers contain both the hydrophobic 304 anti-adhesive compounds as well as hydrophilic 303 segments. These very small hydrophilic 303 segments are considered to act as local separated nucleation sites. As is known from the INA organism and for example in principle resembling a chessboard with its black and white fields, the local ice nucleation points are surrounded by anti adhesive ice repellent segments or areas.

Results and Discussion

Figure 4:
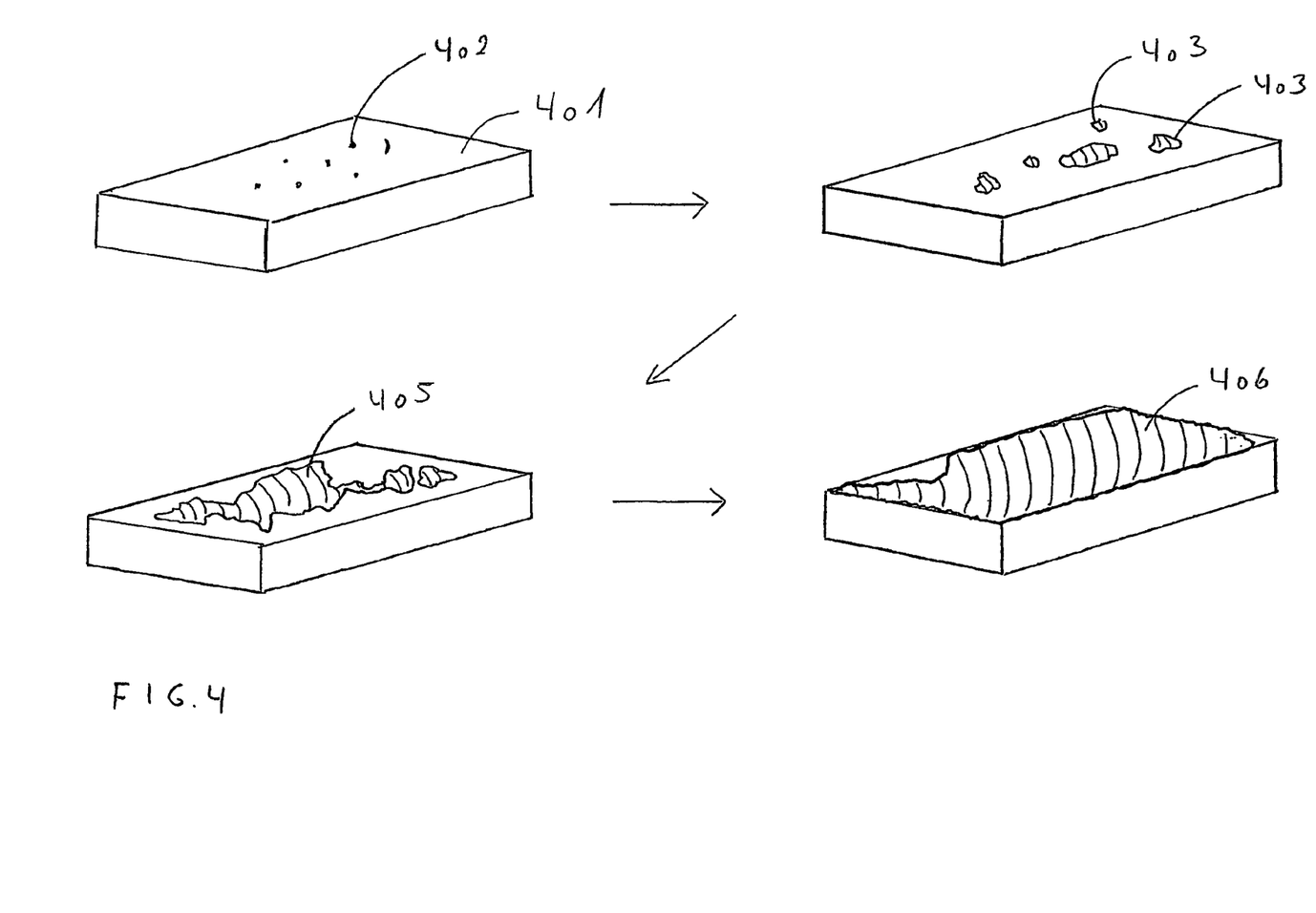
FIG. 4 is a schematic illustration of the ice forming process at cooled polar surfaces under flow conditions.

As illustrated in FIG. 4, the ice formation at cooled surfaces 401 under flow conditions typically starts in form of a local separated heterogeneous nucleation. This process often occurs at inhomogenities 402, e.g. defects, at the surface 401. The amount of nucleation points depends strongly on the surface structure and properties. The nucleation is followed by growth 403 of the nucleus larger than critical size, finally resulting in fusion 405 of these crystals. A thin closed ice layer 406 is formed that growth time dependent in thickness.

We examined in all the experiments carried out a dendrite crystal growth. Our experiments with commercially available water and/or ice repellent coatings showed for most of these coatings a freezing point depressing effect. Compared to non-coated metal surfaces, a higher super cooling was necessary to nucleate ice. The more hydrophobic the coating, the higher the required super cooling. Further, we noted much lower crystallization rates for these coatings. These observations are in agreement with the equation for the nucleation rate, which follows the Arrhenius equation.

$$N \approx \exp\left(\frac{-\Delta G}{kT}\right)$$

The contribution of the foreign surface to the Gibbs free energy in heterogeneous nucleation compared to the homogeneous nucleation is given by the term f $$\Delta G_{het} = f \Delta G_{hom}$$

$$f = \frac{1}{4}(2+\cos\theta)(1-\cos\theta)^2$$

where $\theta$ is the contact angle between the surface and the liquid. According to this equation, a higher contact angle between the liquid phase and the surface will increase the Gibbs free energy and lower the nucleation rate. According to the theory, an ideal ice repellent coating should therefore not be wettable with the liquid phase in order to avoid the surface nucleation. In best case, homogeneous nucleation close to the cooled surface should occur. Unfortunately, all coating-systems show small defects in the form of e.g. pores, impurities, foreign inclusions or contamination. Therefore, total avoidance of surface wetting in water bearing systems for longer periods of time is practically impossible.

Figure 5A:
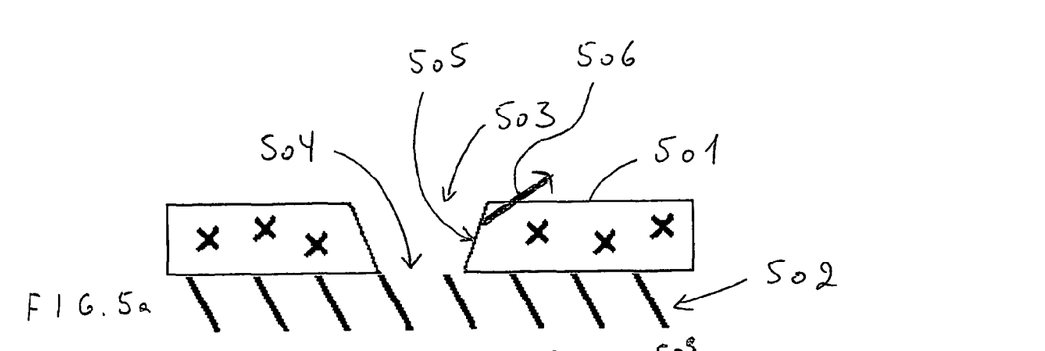
FIG. 5 is an illustration of different coating conditions.

At this point, an important explanation has to be given for understanding the validity of the invention. Coatings 501 according to prior art on metallic surfaces 502 may have defects—in other words, holes or pores 503 in the coating 501 as illustrated in FIG. 5a. In this case, the polar metallic surface 504 in the bottom of the hole 503 may act as nucleation point. However, this type of nucleation points is not envisaged by the invention due to the following reason. As ice formation or salt precipitation takes place in these holes 503, the side walls 505 of the holes 503 are subject to increased pressure pressing the side walls 505 and part of the coating 502 surrounding the hole 503 out of the surface, which is indicated with an arrow 506. Thus, holes 503 increase in size and the area of the surface of the remaining coating 501 decreases. Therefore, coatings 501 according to prior art in this type of application have a very short lifetime.

Figure 5B:
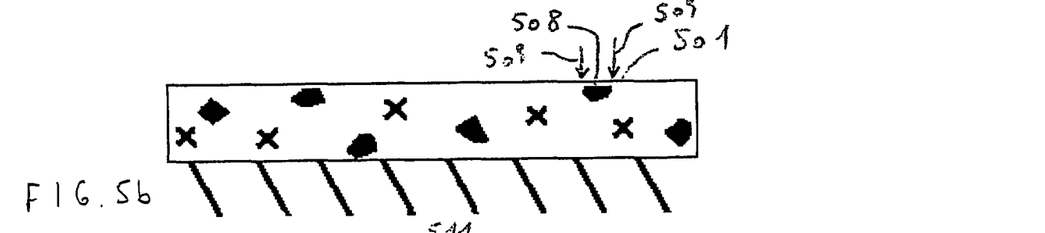
Figure 5C:
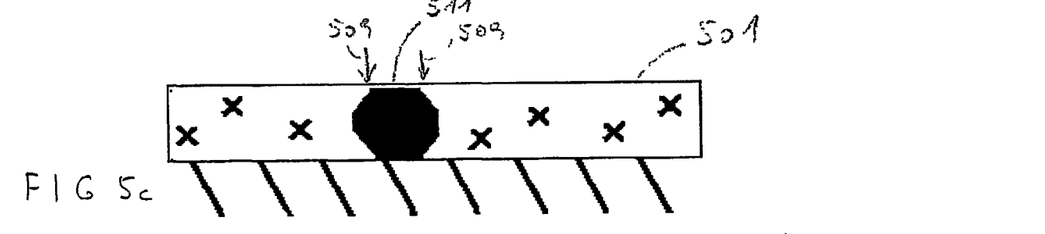
Figure 5D:
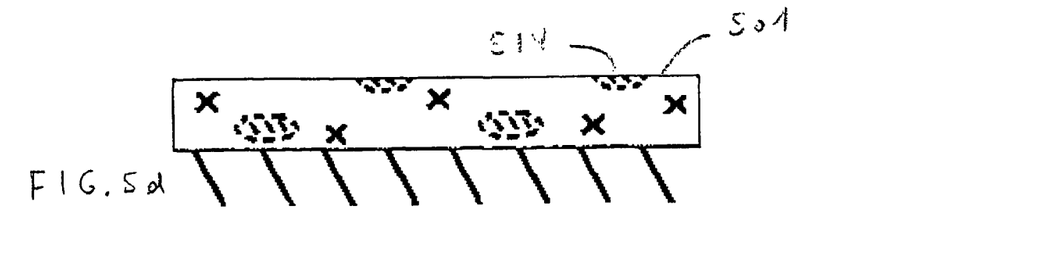

As illustrated in FIGS. 5b and 5c, nucleation points can also be formed by inorganic inclusions 508, 511, like metal oxide or carbide particles within a coating 501, where the particles are part of the coating 501 surface in contact with the water for ice formation. These particles are primary added to coating systems 501 in order to increase the abrasion resistance, but can in principle also form locally separated nucleation points because of their higher surface energy and polarity. However, this type of nucleation points is not envisaged by the invention due to the following reason. As ice formation takes place at these particles 508, 511, strong adhesion forces will occur and with time lead to a lowering of the adhesion between the particle 508, 511, and the coating material 501, primarily at locations as illustrated with the arrows 509 in FIGS. 5b and 5c. Thus, if big ice crystals are formed, the attached particles will after some time be removed out of the coating 501 material because of the strong tensile stress from the ice crystal. Holes 503 will be created within the coating 501, showing similar effects as described above. Therefore, coatings 501 according to prior art in this type of application have a short lifetime.

Differently for the invention, with reference to FIG. 3 and FIG. 5, the functional groups 303, 514 are a covalent bound part of the surface and of the coating 301, 501, respectively, such that no comparable damage can occur. In fact, the functional groups even prevent the coating 301, 501 from being damaged due to ice formation or salt precipitation in eventual holes or pores 503 of the coating 501, because ice formation or salt precipitation takes preferable place at the nucleation points 303, 514, instead of in the holes 503. The reason for this is easily understood with salt precipitation as an illustrating example. As salt precipitation takes place at the nucleation points, the concentration of salt near the surface decreases such that no salt precipitation will take place in the holes of the coating.

With reference to the experiments, independently of the hydrophobicity of the commercial coating system examined, we observed that the crystallization of ice was starting at local points forming dendritic ice crystals. In the early stages of the crystal growth these ice crystals were for some of the coatings removed by the liquid flow. But due to the further growing single crystals fused together, forming at least a thin and closed ice layer. This thin ice layer was for all commercial coatings tested visible sticking at the surface as seen for non-coated surfaces. If first this thin and closed ice layer is formed, the ice releasing property of the coating system is not longer effective. The closed ice layer was growing in thickness, hereby reducing the channel diameter. All ice crystals found in the liquid flow during this later stage of surface crystallization were a result of broken dendrite needles from the growing ice layer. The icephobic effect of the commercial coatings tested lies according to our experiments therefore in a depressing of the crystallization temperature and reduced ice-forming rate. Common for all these coatings is the risk of getting covered with a closed packed thin ice layer making the ice repellence ineffective.

Fluorinated coatings such as commercial types of PTFE, FEP but also fluorinated alkoxsilanes from different Sol-Gel coating systems were not convincing in their icephobicity. Here we observed behavior similar to that of the other commercial coatings tested. These coatings have shown the highest hydrophobicity with contact angles to water and water/freezing depressant solutions of approximately 95 up to 115 degrees. But this higher hydrophobicity had no visible influence on the surface-icing behavior. Obviously, the distinct hydrophobicity of fluorinated coating systems is no longer effective if ice crystals with their strong polarity and directed dipole moments are formed at the surface. A dipole seems to be induced in the high electronegative fluorine resulting in secondary forces and sticking of the ice. Furthermore mechanical interlocking of the ice crystals formed at the PTFE surface will occur because of the well-known porosity of the sintered PTFE surface.

Figure 6A:
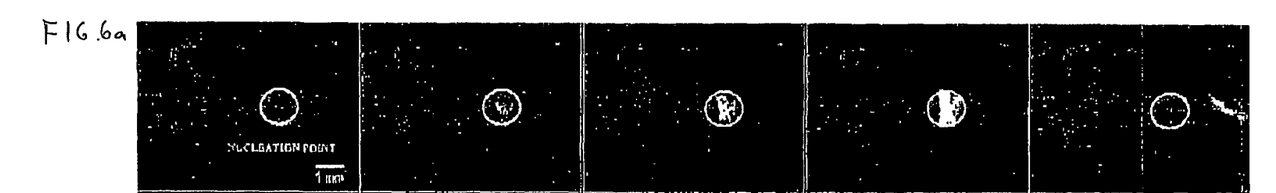
FIGS. 6a-6d, are four photograph series, each with five subsequent images, showing the nucleation rate of ice growth at nucleation points.
Figure 6B:
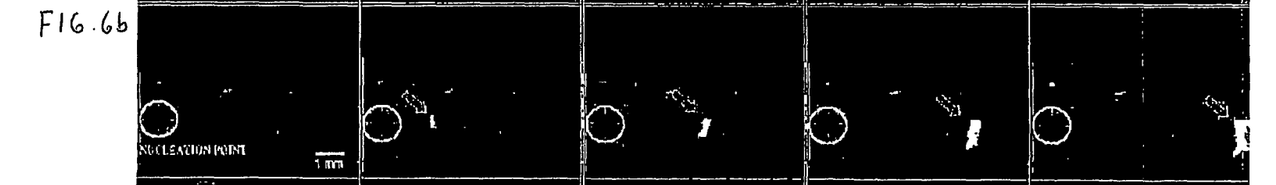
Figure 6C:
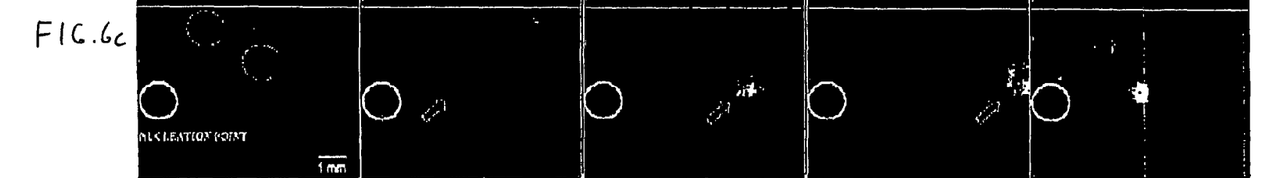

Contrary to the commercial coating systems, our experiments showed that the new biomimetical Ice Nucleating Coatings (INCs) were able to nucleate ice properly and release small crystals (0.1-2 mm) under flow conditions. Four different situations are illustrated in FIG. 6a-6d, showing four photograph series, each with five subsequent images timely interspaced with 1 second as indicated in the bottom of the figure. We discerned two different ice formation mechanisms for the tested INCs. The first consisted in local nucleation and local growth of ice at specific nucleation points (Nps). This phenomenon is shown in FIG. 6a-c.

In FIG. 6a, the nucleation point is encircled, and it is seen that an ice crystal forms and grows in size at the nucleation point, until the flow of the brine removes it at the latest stage of the sequence as shown in the right most image. Ice crystals of a few millimeters were formed and up to 5% of the cooled surface area was covered with ice at the maximum stage of the ice production. In FIG. 6b, the nucleation point is encircled where an ice crystal is formed and released at a rather small size. As the ice crystal—pointed at with an arrow in the image—flows along with the brine, it grows in size. We have named this mechanism the "snowball" effect. This mechanism showed a clear efficiency improvement in the ice production. Ice crystals covered up to 10% of the cooled surface area.

A likewise situation is illustrated in the photo sequence of FIG. 6c, though not only one particle has been formed but a group of ice crystals. This multi-local ice nucleation could be achieved by increasing the amount of hydrophilic nanoparticles or reactive residues in the coating. This appeared to increase the ice production, and the results have shown ice formation in up to 40% of the cooled surface area.

Figure 6D:
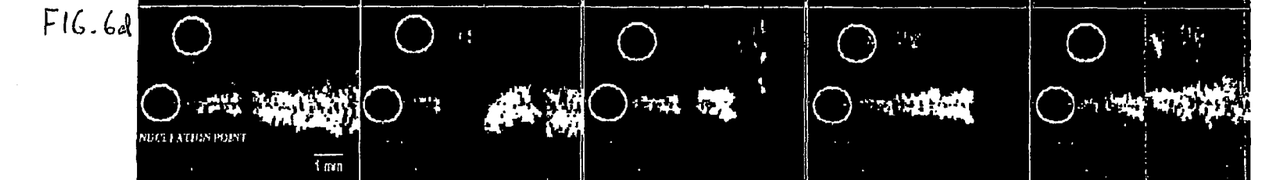

For a single nucleation point (NP), we noticed a strong dependence of flow speed. All tested INCs except the coating shown in FIG. 6d showed similar rates of ice nucleation. At the working flow speed of 1.3 m/s the NPs produced ice crystals approximately every five seconds. Due to further improvements of the coating composition and processing parameters, we tried to increase the nucleation rate of the NPs. The modified nucleation points in the coating shown in FIG. 6d clearly increased the ice nucleation rate, and some specific points were found to produce ice continuously. Working temperatures and blending composition had slight effects on the results of the different coatings. All tested INCs seemed to operate considerably better when using Propyleneglycol aqueous solutions, which freeze at −5° C. or lower temperatures. Some of them also worked well with less concentrated solutions that freeze at −2.5° C.

The lifetime of the developed INCs is an important factor with regard to practical applications. The ice nucleation process and the ice crystals themselves hardly affect the surface stability of the coatings. Therefore, the abrasion resistance of the INCs was, in addition to the ice forming process, in focus during our work. In several coatings tested we observed a time-dependent aging process resulting in reduced ability to release the formed ice. This effect was evident especially after strong freezing of the surfaces due to very fast super cooling. The SEM analyses showed defects and damage to the surface of some of the used coatings. We improved the coating properties of the INC's developed by increasing the density of the inorganic network and selecting other functional groups of nanoparticles. Furthermore, the content of inorganic compounds was varied in the hybrid network to achieve the necessary mechanical and chemical stability of the coating. In addition we anchored organic bridging polymers within the coating network. Due to this, the properties of the INCs were visible improved.

Conclusion on the Experiment

From the experiment, it could be concluded that it is possible to mimic the ice generation mechanism of INA-organisms. Using the sol-gel technology, a technological approach to this mechanism was developed with industrial applicability. The design of the coatings resulted in improvements of the ice producing ability and efficiency going from local nucleation and growth of ice to process growth and increasing production. The "snowball" effect was found to increase the quality of the INC and seems to be the most efficient approach for the new ice generator. Percentages up to 40% of the cooled surface area without sticking of ice can be reached with the multi-local ice production of the coating as shown in FIG. 6c. At a flow speed of 1.3 m/s in the system, NPs can produce ice crystals approximately every five seconds. This proves that the principle can be used for continuous ice production without sticking.

Further Applications

In general, ice making is in great demand worldwide. It plays a key role in the food and cooling industry. Apart from ice-cream production, direct contact cooling or freezing of foodstuff, ice-slurry technology in industrial refrigeration and air conditioning are subject to high interest. In particular ice-slurry, a mixture of small ice particles, water and freeze-depressing agents, is expected to be widely used in the future. Ice-slurry is considered to be the proper substitute for common refrigerants like CFC and HFC since it is an environment friendly coolant with high energy density capacities. In commercial ice generators according to prior art, mechanical scrapping devices remove the ice formed at the cooled surfaces. They are not economically viable due to high cost with regard to design, energy consumption of the mechanical devices and maintenance services. Therefore, it is desirable to develop a new type of ice generator. Applying surface coatings according to the invention, scrapping devices can be avoided. The flow of the ice slurry constantly removes the produced ice particles from the nucleation sites of the cooled surface. Thus, with application of surfaces according to the invention, a large step has been taken towards practical implementation of ice slurry in refrigeration and air conditioning systems.

Though the main aspect of the invention is the creation of icephobic surfaces, for example to be used in connection with ice-slurry machines, the principle of the invention has a much wider scope which will become more apparent in the following.

Calcite is the stabile form of calcium carbonate, the precipitation of which causes the well known lime stone formation. The surface of the calcite crystal is polar with a slightly negative charge. When the crystal is in water contact, its surface is covered with a thin water layer, where the water molecules occupying the interface between the crystal and the water itself, also is called the inner and outer Helmholtz layer. The water molecules have an ordered structure with positive charges directed towards the crystal surface, bound by secondary Van-der-Waals forces to the surface. In addition in this interface, more precise in the outer Helmholtz layer of this electrolytical double layer, positive charged calcium ions are bound. The initial interface interaction between a calcite crystal and a second surface will be occur through the ordered surface water layer with Van-der-Waals forces and hydrogen bonds. The higher the polarity of the second surface, the stronger is the interaction. A structured surface with very small hydrophilic polar segments in a hydrophobic non-polar matrix according to the invention involves a point like interaction with the interface resulting in only local precipitation of calcite at the nucleation points. In case that the surrounding water is moving, formed calcite crystals precipitated at the nucleation points are removed from the nucleation points as soon as the forces from the water flow—depending on the water flow velocity and the crystal—is higher than the binding of the precipitated calcite crystal on the very small nucleation point.

Further applications of the invention could be related to precipitation processes of salts or sugars in processing or foodstuff industries.

The invention claimed is:

1. A substrate with a coating on the substrate, the coating having non-stick properties as to ice or other fluid precipitates, the coating comprising a heterogeneous surface with locally separated polar segments and non-polar islets between the polar segments, wherein the polar segments are covalently bound to the coating surface, wherein the coating comprises an inorganic-organic network, wherein the inorganic-organic network comprises metal atoms or semiconductor atoms.

2. The substrate according to claim 1, wherein the coating on the substrate comprises hydrophilic segments as nucleation points and hydrophobic segments between the nucleation points.

3. The substrate according to claim 1, wherein the coating comprises segments with high surface energy acting as nucleation sites surrounded by a low surface energy matrix.

4. The substrate according to claim 1, wherein the polar segments comprise reactive functional groups or residues.

5. The substrate according to claim 4, wherein the polar segments comprise reactive hydrophilic functional end groups or polyaniline.

6. The substrate according to claim 5, wherein the functional end groups are epoxy, amino, carboxyl, hydroxyl, or methacryl.

7. The substrate of claim 1, wherein the polar segments act as nucleation points for precipitation of limestone from a fluid and the substrate is a component surface.

8. The substrate of claim 1, wherein the polar segments act as nucleation points for precipitation of salt from a fluid.

9. The substrate of claim 1, wherein the polar segments act as nucleation points for precipitation of calcium carbonate from a fluid.

10. The substrate of claim 1, wherein the polar segments act as nucleation points for precipitation of magnesium carbonate from a fluid.

11. The substrate of claim 1, wherein the polar segments act as nucleation points for precipitation of sugar from a fluid.

12. The substrate of claim 1, wherein the polar segments act as nucleation points for precipitation of ice from a fluid.

13. The substrate of claim 12, wherein the fluid is air.

14. The substrate of claim 12, wherein the fluid is at least one of: water, water containing a freezing point depressing agent, water containing ethanol, water containing propylene glycol, and water containing ethylene glycol.

15. The substrate of claim 12, wherein the substrate is part of at least one of: a refrigeration system, an air conditioning system, an airplane, a helicopter wing, a wind mill, and a ship.

16. The substrate according to claim 1, wherein the coating constitutes a smooth, anti-adhesive surface.

17. The substrate according to claim 1, wherein the coating constitutes a smooth nanostructured layer containing both hydrophobic and hydrophilic segments.

18. The substrate according to claim 1, wherein the coating constitutes a smooth, very thin nanostructured hybrid layer.

19. The substrate according to claim 1, wherein the inorganicorganic network comprises organic functional groups linked to metallic atoms or semi-conductor atoms.

20. The substrate according to claim 19, wherein the metallic atoms are selected from the group consisting of Al, Ti, Zr, Hf and the semi-conductor atoms are Si.

21. The substrate according to claim 19, wherein the metallic atoms or semiconductor atoms are bonded to the substrate through oxygen bridges.

22. The substrate according to claim 19, wherein the organic functional groups are crosslinked with metal alkoxides, wherein said metal alkoxides are crosslinked to the coating surface.

23. The substrate according to claim 1, wherein the coating surface is heterogeneous.

24. The substrate according to claim 1, wherein the polar segments and non-polar islets comprise hydrophilic nanoparticles and hydrophobic nanoparticles, respectively synthesized from organic modified silicone alkoxides.

25. The substrate according to claim 24, wherein the nanoparticles are covalently bonded to metallic atoms or semiconductor atoms, and the metallic atoms or semi-conductor atoms are covalently bonded to said substrate through oxygen bridges.

26. The substrate according to claim 24, wherein the hydrophilic nanoparticles contain reactive groups comprising epoxy, amino, carboxyl, hydroxyl or methacryl, or polyaniline.

27. The substrate according to claim 24, wherein the hydrophilic nanoparticles are cross linked with hydrophobic polymers, the hydrophobic polymers being alkylbenzenes or alkylphenols.

* * * * *